United States Patent
Renollett et al.

(10) Patent No.: US 10,788,141 B2
(45) Date of Patent: Sep. 29, 2020

(54) FLUSH-MOUNT NPT PLUG (71) Applicant: TESCOM CORPORATION, Elk River, MN (US)

(72) Inventors: Jacob T. R. Renollett, Andover, MN (US); Eric J. Burgett, McKinney, TX (US)

(73) Assignee: TESCOM CORPORATION, Elk River, MN (US)

( * ) Notice: Subject to any disclaimer, the term of this patent is extended or adjusted under 35 U.S.C. 154(b) by 81 days.

(21) Appl. No.: 15/193,973

(22) Filed: Jun. 27, 2016

(65) Prior Publication Data

US 2016/0377191 A1 Dec. 29, 2016

Related U.S. Application Data

(60) Provisional application No. 62/184,698, filed on Jun. 25, 2015.

(51) Int. Cl.
| | | |
|---|---|---|
| *F16K 31/42* | (2006.01) | |
| *F16K 27/02* | (2006.01) | |
| *A62C 4/00* | (2006.01) | |
| *F16L 55/11* | (2006.01) | |

(Continued)

(52) U.S. Cl.
CPC ............ *F16K 31/42* (2013.01); *F16K 27/003* (2013.01); *F16K 27/029* (2013.01); *F16K 31/06* (2013.01); *A62C 4/00* (2013.01); *F16L 55/1108* (2013.01)

(58) Field of Classification Search
CPC ........ F16K 31/42; F16K 31/06; F16K 31/124; F16K 31/1245; F16K 31/128; F16K 27/003; F16K 27/029; F16L 55/1108; F15B 11/006; F15B 20/00; F15B 2211/30575; F15B 2211/6306; F15B 2211/86;

(Continued)

(56) References Cited

U.S. PATENT DOCUMENTS 2,853,090 A * 9/1958 Hanna ..................... F16K 31/40
    137/82
3,893,487 A     7/1975 Engelking
3,952,774 A     4/1976 Loveless (Continued)

FOREIGN PATENT DOCUMENTS

WO     WO-2008/048551 A2    4/2008

OTHER PUBLICATIONS

International Search Report for Application No. PCT/US2016/039493 dated Sep. 13, 2016.

(Continued)

*Primary Examiner* — Kevin F Murphy
*Assistant Examiner* — Jonathan J Waddy
(74) *Attorney, Agent, or Firm* — Marshall, Gerstein & Borun LLP (57) ABSTRACT

An electro-pneumatic controller includes a base portion having at least one lateral surface and a plurality of passageways disposed through the base portion. A bore extends through the lateral surface, and the bore has a counterbore portion and a threaded engagement portion. A standard NPT plug may be coupled to the base portion, and the plug has a head portion and an engagement portion that threadedly engages the engagement portion of the bore. A top surface of the head portion of the plug is coplanar with the lateral surface of the base portion or is disposed within the counterbore portion of the bore.

19 Claims, 6 Drawing Sheets

(51) Int. Cl.
  *F16K 31/06* (2006.01)
  *F16K 27/00* (2006.01)
(58) Field of Classification Search
  CPC .... F15B 2211/8855; F15B 5/006; A62C 4/00;
  A62C 4/02; G05D 16/20
  USPC .......................................................... 138/89
  See application file for complete search history.

(56) References Cited

U.S. PATENT DOCUMENTS

| | | | | |
|---|---|---|---|---|
| 3,963,048 | A * | 6/1976 | Bowman | ................. F16K 11/10 137/596.1 |
| 3,993,102 | A * | 11/1976 | Polster | ................. F16L 55/115 138/89 |
| 5,253,669 | A * | 10/1993 | Gray | ................. G05D 16/2053 137/14 |
| 6,021,799 | A * | 2/2000 | Price | ................. B05B 7/1404 137/102 |
| 6,227,223 | B1 * | 5/2001 | Crochet | ................. F16K 27/07 105/377.07 |
| 6,584,999 | B2 * | 7/2003 | Inayama | ............ G05D 16/2024 137/487.5 |
| 7,631,664 | B1 | 12/2009 | Mailand | |
| 2004/0221980 | A1 | 11/2004 | Sidener et al. | |
| 2011/0108292 | A1 * | 5/2011 | Moyer | ................. A62C 4/00 169/48 |
| 2014/0358303 | A1 * | 12/2014 | Leonard | ............ G05D 16/2093 700/283 |
| 2016/0375285 | A1 * | 12/2016 | Renollett | ................. A62C 4/02 169/48 |

OTHER PUBLICATIONS

Written Opinion for Application No. PCT/US2016/039493 dated Sep. 13, 2016.

* cited by examiner

FLUSH-MOUNT NPT PLUG

FIELD OF THE DISCLOSURE

This disclosure relates generally to controllers for a process control valve or regulator, and more specifically to electro-pneumatic controllers.

BACKGROUND

Electro-pneumatic controllers (also called electro-pneumatic regulators) are typically used to precisely control the pressure of control fluid used to position a pneumatically-controlled device. For example, an electro-pneumatic controller can be used to control the pressure of control fluid into a pneumatic actuator of a process control valve or regulator to precisely position the process control valve or regulator. The electro-pneumatic controllers may include one or more passageways to receive the control fluid, and one or more solenoid valves may control the flow of the control fluid through the passageway of the electro-pneumatic controllers. The one or more solenoid valves may be in communication with a microprocessor and associated circuitry, and the microprocessor may be in communication with one or more sensors disposed outside of the electro-pneumatic controller (e.g., within an interior portion of the pneumatic actuator of the process control valve or regulator) to provide closed-loop control of the electro-pneumatic controller and/or the process control valve or regulator. The one or more passageways, one or more solenoid valves, and the microprocessor and associated circuitry may all be disposed within a housing that allows the electro-pneumatic controller to act as a modular device. Because inert gas is typically used as a control fluid, there is no danger of the microprocessor or associated circuitry igniting the control fluid.

BRIEF SUMMARY OF THE DISCLOSURE

An electro-pneumatic controller may include a base portion having at least one lateral surface, and a plurality of passageways may be disposed through the base portion. At least one of the plurality of passageway may be adapted to be coupled to a source of control fluid. At least one bore extends through the at least one lateral surface, and the at least one bore having a counterbore portion and an engagement portion having an outer surface and all or a portion of the outer surface may be threaded. The electro-pneumatic controller may also include a cap portion having an interior, and the cap portion may be removably secured to the base portion. At least one solenoid valve may be coupled to the base portion and may be disposed at least partially within the interior of the cap portion. The electro-pneumatic controller may additionally include a standard NPT plug 86 having a head portion and an engagement portion having an outer surface, and all or a portion of the outer surface may be threaded and may be in threaded engagement with all or a portion of the outer surface of the engagement portion of the bore to secure the standard NPT plug 86 to the base portion. A top surface of the head portion of the standard NPT plug may be coplanar with the at least one lateral surface of the base portion or may be disposed within the counterbore portion of the bore.

A method of providing a bore on a base portion of an electro-pneumatic controller is provided, the base portion comprising at least one lateral surface, and a plurality of passageways are disposed through the base portion. A first one of the plurality of passageways is adapted to be coupled to a source of a control fluid, and the electro-pneumatic controller includes a cap portion having an interior and that is removably secured to the base portion and at least one solenoid valve coupled to the base portion and disposed at least partially within the interior of the cap portion. The electro-pneumatic controller further includes a standard NPT plug having a head portion and an engagement portion having an outer surface, wherein all or a portion of the outer surface may be threaded, the head portion having a top surface. The method includes providing a counterbore portion of the bore and an engagement portion of the bore, the engagement portion having an outer surface and all or a portion of the outer surface is threaded, wherein when the standard NPT plug is disposed within the bore. All or a portion of the outer surface of the engagement portion of the standard NPT plug is in threaded engagement with all or a portion of the outer surface of the engagement portion of the bore, and a top surface of the head portion of the standard NPT plug is coplanar with the at least one lateral surface of the base portion or is disposed within the counterbore portion of the bore when the standard NPT plug is disposed within the bore.

DETAILED DESCRIPTION

Figure 1:
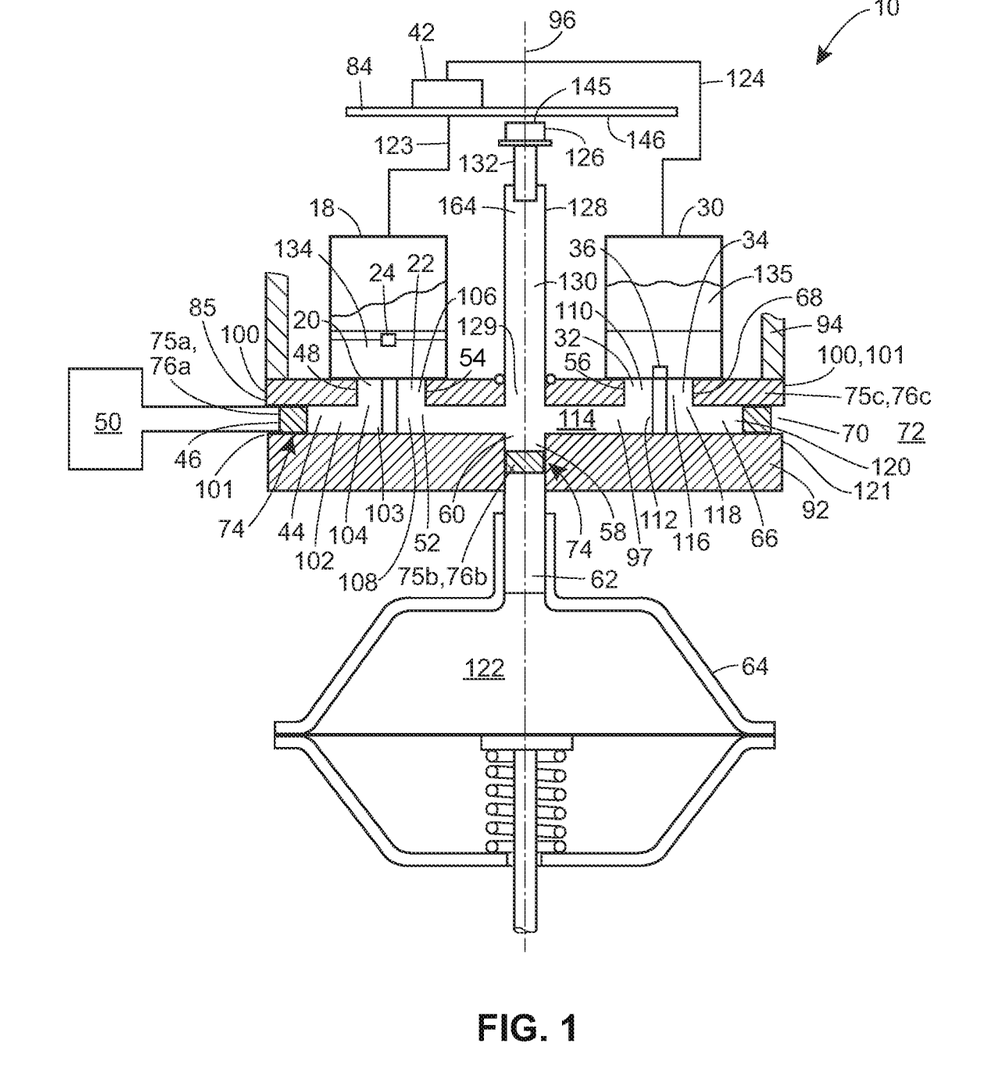
FIG. 1 is a schematic view of an embodiment of an electro-pneumatic controller.
Figure 2A:
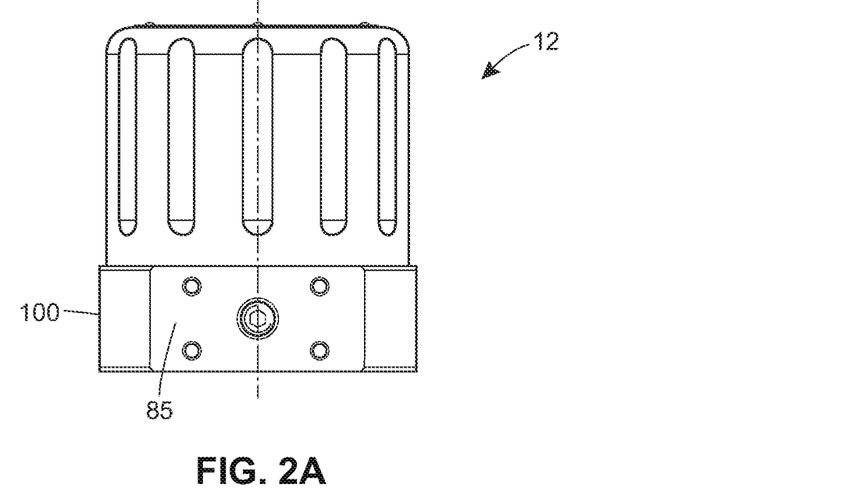
FIG. 2A is a front view of an embodiment of an electro-pneumatic controller.
Figure 2B:
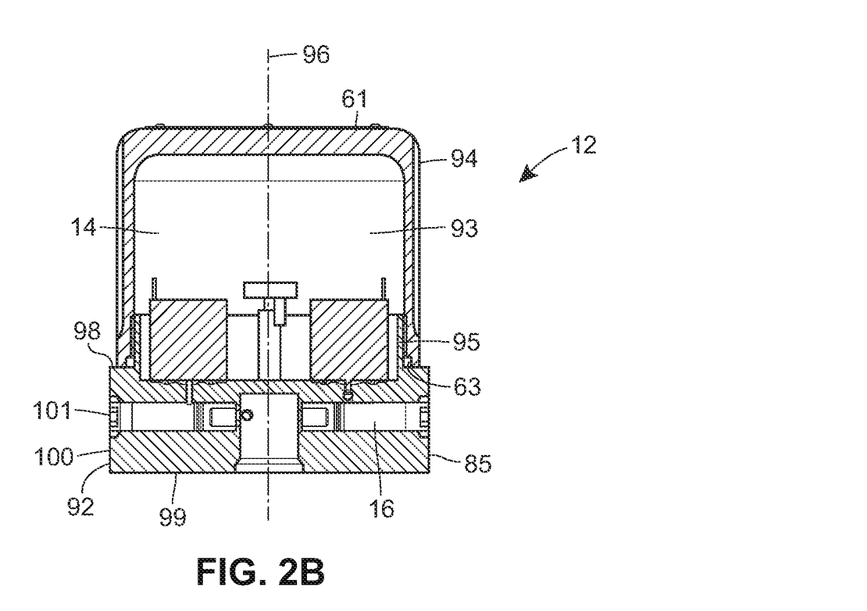
FIG. 2B is a sectional view of the embodiment of the electro-pneumatic controller illustrated in FIG. 2A taken along line S-S.

As illustrated in FIG. 1, an electro-pneumatic controller 10 (that may use a non-inert fluid as a control fluid) may include a base portion 92 having at least one lateral surface 100, and a plurality of passageways 97 is disposed through the base portion 92. At least one of the plurality of passageway 97 may be adapted to be coupled to a source 50 of control fluid. Referring to FIG. 3B, at least one bore 148 extends through the at least one lateral surface 100, and the at least one bore 148 having a counterbore portion 149 and an engagement portion 151 having an outer surface 156 and all or a portion of the outer surface 156 may be threaded. As illustrated in FIGS. 2A and 2B, the electro-pneumatic controller 10 may also include a cap portion 94 having an interior 93, and the cap portion 94 is removably secured to the base portion 92. At least one solenoid valve 18 is coupled to the base portion 92 and is disposed at least partially within the interior 93 of the cap portion 94.

Figure 3A:
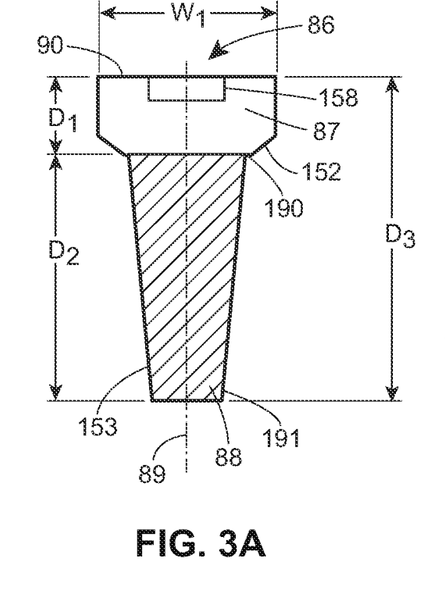
FIG. 3A is a front view of an embodiment of a standard NPT plug.
Figure 3B:
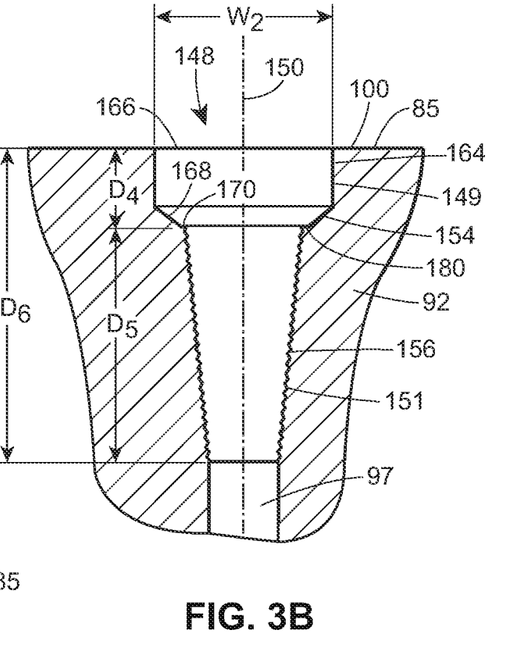
FIG. 3B is a section view of a bore formed in a base portion of an embodiment of an electro-pneumatic controller.

Referring to FIG. 3A, the electro-pneumatic controller 10 additionally includes a standard NPT plug 86 having a head portion 87 and an engagement portion 88 having an outer surface 153, and all or a portion of the outer surface 153 may be threaded and may be in threaded engagement with all or a portion of the outer surface 156 of the engagement portion 151 of the bore 148 to secure the standard NPT plug 86 to the base portion 92. A top surface 90 of the head portion 87 of the standard NPT plug 86 is coplanar with the at least one lateral surface 100 of the base portion 92 or is disposed within the counterbore portion 149 of the bore 148. So configured, the top surface 90 of the head portion 87 of the standard NPT plug 86 does not extend upwardly from the lateral surface 100 of the base portion 92, thereby creating a smooth cosmetic appearance. In addition, such a configuration allows a label or other attachment to be affixed to the lateral surface 100 of the base portion 92.

Turning to the electro-pneumatic controller 10 in more detail, and with reference to FIGS. 2A and 2B, the housing assembly 12 may include a base portion 92 and a cap portion 94 secured to the base portion 92. As illustrated in FIG. 2B, the cap portion 94 may have one or more interior walls that cooperate to define an interior 93 that may contain at least a portion of the first solenoid valve 18, the second solenoid valve 30, and/or the processor 42. All or a portion of the interior 93 may correspond to the first interior portion 14. In some embodiments, the cap portion 94 may have a cylindrical shape or a substantially cylindrical shape that extends along a longitudinal axis 96 from a closed first end 61 to an open second end 63. The cap portion 94 may be made or fabricated from any suitable material, such as plastic, steel (e.g., stainless steel), or aluminum, for example. The cap portion 94 may be removably secured to the base portion 92 in any known manner. For example, the open second end 63 of the cap portion 94 may be sized to receive an annular flange 95, and the open second end 63 may be coupled to the annular flange 95 (e.g., by a threaded connection) and/or to one or more portions of the base portion 92 (e.g., by mechanical fasteners).

As illustrated in FIG. 2B, the base portion 92 may also extend along the longitudinal axis 96 from a first end 98 to a second end 99, and the open second end 63 of the cap portion 94 may be adjacent to the first end 98 when the cap portion 94 is secured to the base portion 92. The base portion 92 may include one or more lateral surfaces 100 that may extend along or substantially along the longitudinal axis 96, and the one or more lateral surfaces 100 may include one or more planar portions 85.

The base portion 92 may be made or fabricated from any suitable material, such as plastic, steel (e.g., stainless steel), or aluminum, for example. The base portion 92 may include a plurality of passageways 97, such as the input passageway 44, the intermediate passageway 52, the outlet passageway 58, and/or the exhaust passageway 66. All or a portion of the plurality of passageways 97 may be disposed through or within the base portion 92, and all or a portion of the plurality of passageways 97 may extend within the second interior portion 16 of the housing assembly 12. The plurality of passageways 97 (or each of the plurality of passageways 97) may have any suitable cross-sectional shapes and/or dimensions or combinations of shapes and/or dimensions. For example, each of the plurality of passageways 97 may have a circular cross-sectional shape.

Referring to FIG. 1, the plurality of passageways 97 may include the input passageway 44, and all or a portion of the input passageway 44 may extend within the second interior portion 16 of the housing assembly 12. The input passageway 44 may include the first end 46 that may be coupled to the source 50 of the fluid (e.g., a non-inert gas, such as natural gas), and the first end 46 may be disposed at or adjacent to a first portion 101 of the lateral surface(s) 100 of the base portion 92. The input passageway 44 may include a first segment 102 that may be linear and may extend through the base portion 92 normal (or substantially normal) to the longitudinal axis 96 from the first end 46 to a corner portion 103. The input passageway 44 may also include a second segment 104 that may be linear and may extend through the base portion 92 along (or substantially along) the longitudinal axis 96 from the corner portion 103 to the second end 48. The second end 48 may be coupled to the inlet 20 of the first solenoid valve 18.

The plurality of passageways 97 may also include the intermediate passageway 52 that may be disposed at least partially within the base portion 92, and all or a portion of the intermediate passageway 52 may extend within the second interior portion 16 of the housing assembly 12. The intermediate passageway 52 may extend from the first end 54 coupled to the outlet 22 of the first solenoid valve 18 and the second end 56 coupled to the inlet 32 of the second solenoid valve 30. More specifically, as illustrated in FIG. 1, the intermediate passageway 52 may include a first segment 106 that extends from the first end 54 to a first corner portion 108, and the first segment 106 may be linear (or substantially linear) and may extend along (or substantially along) the longitudinal axis 96 from the first end 54 to the first corner portion 108 to the second end 48. The intermediate passageway 52 may also include a second segment 110 that extends from the second end 56 to a second corner portion 112, and the second segment 110 may be linear (or substantially linear) and may extend along (or substantially along) the longitudinal axis 96 from the second end 56 to the second corner portion 112. The intermediate passageway 52 may further include a third segment 114 that extends between the first segment 106 and the second segment 110 between the first corner portion 108 and the second corner portion 112, and the third segment 114 may be normal (or substantially normal) to the longitudinal axis 96.

The plurality of passageways 97 may also include the outlet passageway 58 that may be disposed at least partially within the base portion 92, and all or a portion of the outlet passageway 58 may extend within the second interior portion 16 of the housing assembly 12. The outlet passageway 58 may be coupled to the intermediate passageway 52 and a volume 122 of the pneumatic actuator 64 of, for example, a control valve (not shown). More specifically, the outlet passageway 58 may include the first end 60 that is coupled to the third segment of the intermediate passageway 52 between (e.g., midway between) the first corner portion 108 and the second corner portion 112. The second end 62 of the outlet passageway 58 adapted to be coupled to the volume 122 of the pneumatic actuator 64, and the outlet passageway 58 may be linear and parallel to (or coaxially-aligned with) the longitudinal axis 96.

The plurality of passageways 97 may also include the exhaust passageway 66, and all or a portion of the exhaust passageway 66 may extend within the second interior portion 16 of the housing assembly 12. The exhaust passageway 66 may include the first end 68 that may be coupled to the outlet 34 of the second solenoid valve 30. The exhaust passageway 66 may include a first segment 116 that may be linear and may extend through the base portion 92 along (or substantially along) the longitudinal axis 96 from the first end 68 to a corner portion 118. The exhaust passageway 66 may also include a second segment 120 that may be linear and may extend through the base portion 92 normal (or substantially normal) to the longitudinal axis 96 from the corner portion 118 to the second end 70. The second end 70 may be coupled to the atmosphere 72, and the second end 70 may be disposed at or adjacent to a second portion 121 of the lateral surface(s) 100 of the base portion 92.

The electro-pneumatic controller 10 may also include the processor 42 in communication with the first solenoid valve 18 and/or the second solenoid valve 30. The processor 42 may be in communication (e.g., hardwire communication or wireless communication) with one or more devices (not shown) located remote from the electro-pneumatic controller 10. The processor 42 may be mounted to a circuit board 84 disposed within the interior 93 of the cap portion 94. The circuit board 84 may be disposed adjacent to or offset from a top portion of each of the first solenoid valve 18 and/or the second solenoid valve 30, and the circuit board 84 may be normal to the longitudinal axis 96.

Figure 4A:
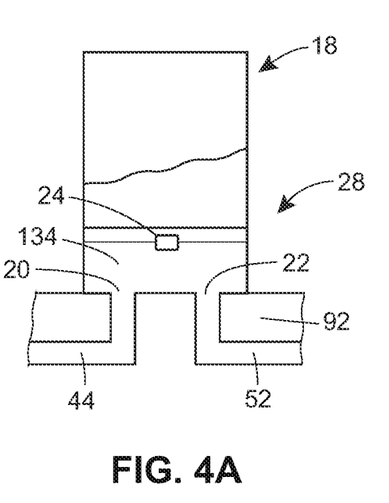
FIG. 4A is a section view of an embodiment of a first solenoid valve in an open position.
Figure 4B:
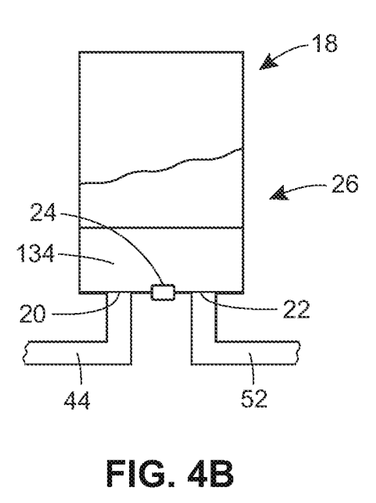
FIG. 4B is a section view of the first solenoid valve of FIG. 4A in a closed position.

The first solenoid valve 18 may be secured or coupled to the base portion 92, and the first solenoid valve 18 may be disposed within the interior 93 of the cap portion 94. So secured, the first solenoid valve 18 may be disposed within the first interior portion 14 of the housing assembly 12. The first solenoid valve 18 may have an inlet 20 that is in communication with the second end 48 of the input passageway 44 and an outlet 22 that is in communication with the first end 54 of the intermediate passageway 52. The first solenoid valve 18 also has a valve member 24 movable between a closed position 26 (see FIG. 4B) to an open position 28 (see FIG. 4A), and the first solenoid valve 18 may be a normally closed valve. The first solenoid valve 18 may also have an interior portion 134 that may be a volume in the interior of the first solenoid valve 18 in fluid communication with the inlet 20 and the outlet 22. In the closed position 26, flow from the inlet 20 to the outlet 22 is prevented. In the open position 28, flow from the inlet 20 to the outlet 22 (e.g., flow through the inlet 20, into the interior portion 134, and out of the outlet 22) is allowed.

Figure 6A:
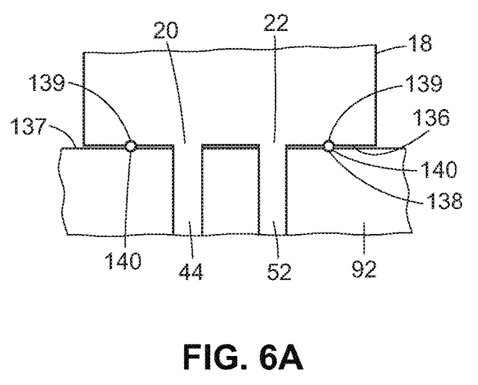
FIG. 6A is a section view of an embodiment of a first solenoid valve coupled to the base portion.

As illustrated in FIG. 6A, a bottom surface 136 of the first solenoid valve 18 may be disposed on or adjacent to a first portion of a top surface 137 of the base portion 92, and a seal 138 (e.g., an O-ring) may be disposed between the bottom surface 136 of the first solenoid valve 18 and the top surface 137 of the base portion 92. The seal 138 may be (at least partially) disposed in a groove 139, 140 formed in each of the bottom surface 136 of the first solenoid valve 18 and the top surface 137 of the base portion 92, respectively. The grooves 139, 140 and the seal 138 may have a circular shape (when viewed normal to the top surface 137 of the base portion 92) and the grooves 139, 140 and the seal 138 may surround the outlet 20 and inlet 22 of the first solenoid valve 18 to prevent leakage of fluid (flowing from the inlet 20 to the outlet 22 of the first solenoid valve 18) between the gap formed between the bottom surface 136 of the first solenoid valve 18 and the top surface 137 of the base portion 92. The first solenoid valve 18 may include components made of carbon steel (e.g., chrome plated carbon steel) and/or brass (chrome plated brass).

The first solenoid valve 18 may be in communication with the processor 42 (e.g., by a communication line 123), which may provide one or more signals to move the valve member 24 from the open position 28 to the closed position 26 and/or from the closed position 26 to the open position 28. For example, the processor 42 may provide a first signal to move the valve member 24 from the closed position 26 to the open position 28 and/or a second signal to move the valve member 24 from the open position 28 to the closed position 26.

Figure 5A:
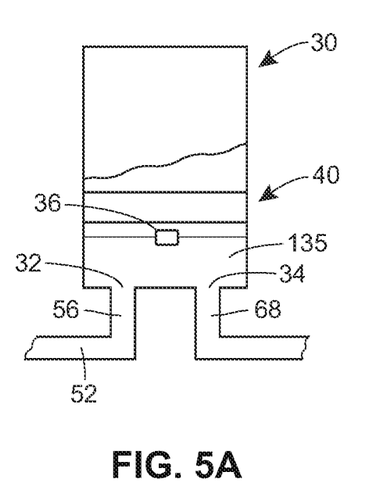
FIG. 5A is a section view of an embodiment of a second solenoid valve in an open position.
Figure 5B:
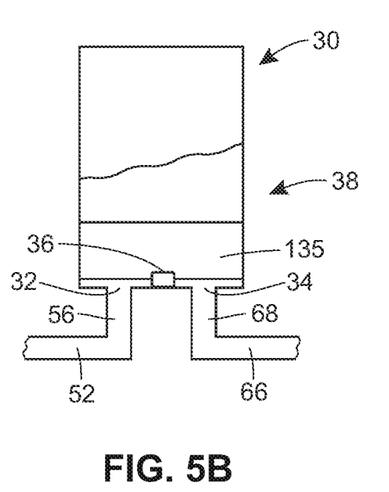
FIG. 5B is a section view of the second solenoid valve of FIG. 5A in a closed position.

The second solenoid valve 30 may have an inlet 32 that is in communication with the second end 56 of the intermediate passageway 52 and an outlet 34 that is in communication with the first end 68 of the exhaust passageway 66. The second solenoid valve 30 also has a valve member 36 movable between a closed position 38 (Illustrated in FIG. 5B) to an open position 40 (illustrated in FIG. 5A), and the second solenoid valve 30 may be a normally closed valve. The second solenoid valve 30 may also have an interior portion 135 that may be a volume in the interior of the second solenoid valve 30 in fluid communication with the inlet 32 and the outlet 34. In the closed position 38, flow from the inlet 32 to the outlet 34 is prevented. In the open position 40, flow from the inlet 32 to the outlet 34 (e.g., flow through the inlet 32, into the interior portion 135, and out of the outlet 34) is allowed.

Figure 6B:
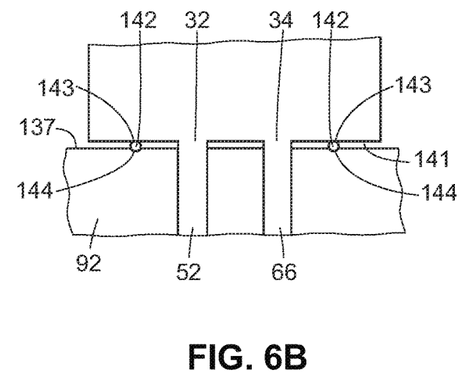
FIG. 6B is a section view of an embodiment of a second solenoid valve coupled to the base portion.

As illustrated in FIG. 6B, a bottom surface 141 of the second solenoid valve 30 may be disposed on or adjacent to a second portion of a top surface 137 of the base portion 92, and a seal 142 (e.g., an O-ring) may be disposed between the bottom surface 141 of the second solenoid valve 30 and the top surface 137 of the base portion 92. The seal 142 may be (at least partially) disposed in a groove 143, 144 formed in each of the bottom surface 141 of the second solenoid valve 30 and the top surface 137 of the base portion 92, respectively. The grooves 143, 144 and the seal 142 may have a circular shape (when viewed normal to the top surface 137 of the base portion 92) and the grooves 143, 144 and the seal 142 may surround the outlet 34 and inlet 32 of the second solenoid valve 30 to prevent leakage of fluid (flowing from the inlet 32 to the outlet 34 of the second solenoid valve 30) between the gap formed between the bottom surface 141 of the second solenoid valve 30 and the top surface 137 of the base portion 92.

The second solenoid valve 30 may be in communication with the processor 42 (e.g., by a communication line 124), which may provide one or more signals to move the valve member 36 from the open position 40 to the closed position 38 and/or from the closed position 38 to the open position 40. For example, the processor 42 may provide a first signal to move the valve member 36 from the closed position 38 to the open position 40 and/or a second signal to move the valve member 36 from the open position 40 to the closed position 38. The second solenoid valve 30 may include components made of carbon steel (e.g., chrome plated carbon steel) and/or brass (chrome plated brass).

One or more pressure transducers 126 may be coupled to or in communication with the processor 42, and the one or more pressure transducers 126 (or pressure sensors) may be adapted to measure pressure in a desired portion(s) of one or all of the plurality of passageways 97. For example, a pressure transducer 126 may be positioned or disposed to measure pressure in the intermediate passageway 52 and/or outlet passageway 58. For example, as illustrated in FIG. 1, a cylindrical tube 128 may be secured to the base portion 92 adjacent to an aperture of a passageway 129 of the base portion 92 that is in communication with the intermediate passageway 52 and/or outlet passageway 58, and the cylindrical tube 128 and passageway 129 may (at least partially) define a transducer passageway 130 that be in communication with the intermediate passageway 52 and/or outlet passageway 58 and that may extend vertically upward and parallel to or along the longitudinal axis 96. The pressure transducer 126 may be disposed at or adjacent to an end portion 132 of the transducer passageway 130, and a top portion 145 of the transducer 126 may be disposed adjacent to a bottom portion 146 of the circuit board 84. The one or more pressure transducers 126 may be any type of transducer or sensor known in the art, such as a digital, analog, and/or mechanical sensor.

The electro-pneumatic controller 10 may be a proportional-integral-derivative ("PID") controller that calculates an error value as the difference between a measured process variable and a desired setpoint, and the RID controller attempts to minimize the error by adjusting the process through use of a manipulated variable. To this end, when it is desired to increase pressure in the volume 122 of the actuator 64, the processor 42 sends an appropriate signal open the first solenoid valve 18 and to close the second solenoid valve 30. Consequently, the valve member 24 of the first solenoid valve 18 is moved to the open position 28, allowing fluid from the source 50 to travel through the input passageway 44, through the intermediate passageway 52, through the outlet passageway 58, and into the volume 122 of the pneumatic actuator 64, thereby increasing pressure inside the volume 122. When the valve member 36 of the second solenoid valve 30 is moved to the closed position 38, fluid from the volume 122 of the actuator 64 is prevented from flowing through the second solenoid valve 30 and venting through the atmosphere 72.

When it is desired to decrease pressure in the volume 122 of the actuator 64, the processor 42 sends an appropriate signal close the first solenoid valve 18 and to open the second solenoid valve 30. Consequently, the valve member 24 of the first solenoid valve 18 is moved from the open position 28 to the closed position 26, preventing fluid from the source 50 from traveling through the input opening 44, the intermediate passageway 52, the outlet passageway 58, and into the volume 122 of the pneumatic actuator 64. When the valve member 36 of the second solenoid valve 30 is moved to the closed position 38 to the open position 40, fluid from the volume 122 of the actuator 64 is allowed to flow from the outlet passageway 58, the intermediate passageway 52, and the outlet passageway 66 to vent to the atmosphere 72. By adjusting the pressure in the volume 122 of the pneumatic actuator 64 as described, a position of a valve member (not shown) of a control valve (not shown) can be precisely controlled.

In some applications, the source 50 may include a non-inert control fluid (for example, natural gas). Because the non-inert control fluid may be flammable, precautions must be taken to prevent the ignition of the non-inert control fluid. For example, the processor 42 and associated electronics disposed within the first interior portion 14 of the housing assembly (e.g., within the interior 93 of the cap portion 94) may be intrinsically-safe, which means that the associated voltages and/or currents are regulated to a maximum value that is below a value that would ignite the non-inert control fluid. However, such intrinsically-safe electronics may require a significant redesign of the existing non-intrinsically-safe electronics that are provided with a conventional controller, and therefore providing intrinsically-safe electronics significantly increases the cost of the controller. Instead of providing intrinsically-safe electronics, a flameproof barrier may be disposed between the first interior portion 14 of the housing assembly 12 (which contains the processor 42, communication lines 123, 124, and associated electronics) and the plurality of passageways 97 disposed within the second interior portion 16 of the housing assembly 12. The flameproof barrier prevents the combustion of an explosion from escaping outside of a barrier in the event that the non-inert control fluid is ignited by the processor 42 or associated electronics.

Figure 7A:
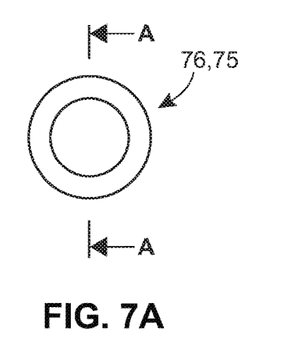
FIG. 7A is a front view of an embodiment of a flameproof joint.
Figure 7B:
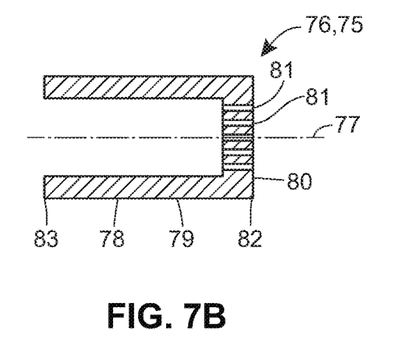
FIG. 7B is a sectional view of the embodiment of the flameproof joint illustrated in FIG. 7A and taken along line A-A.

Accordingly, in some embodiments of the electro-pneumatic controller 10 using a non-inert gas as a control fluid, the flameproof barrier assembly 74 may include one or more flameproof joints 75. Each of the flame proof joints 75 may be disposed within a desired one of the plurality of passageways 97 to prevent or to limit the spread of an open fire or explosion that might occur due to the ignition of the non-inert process fluid. Each flameproof joint 75 may be a flame arrestor 76. The flame arrestor 76 functions by absorbing heat from a flame front traveling at sub-sonic velocities, thus dropping the burning gas/air mixture below its auto-ignition temperature and extinguishing the flame. Each flame arrestor 76, as illustrated in FIGS. 7A and 7B, may be elongated and extend along an axis 77 from a first end 82 to an open second end 83. Each flame arrestor 76 may be shaped and dimensioned along that axis to fit tightly within a desired portion of any of the plurality of passageways 97 (e.g., the passageway 44, 52, 58, 66). For example, each flame arrestor 76 may have an outer wall 78 that may be elongated and may extend along the axis 77 from the first end 82 to the second end 83 of the flame arrestor 76, and the outer wall 78 may be sized and dimensioned to fit tightly in a desired portion of any of the plurality of passageways 97, and a cross-sectional shape of an exterior surface 79 of the outer wall 78 may correspond to the interior shape of the one of the plurality of passageways 97 in which the flame arrestor 76 is disposed. For example, each of the cross-sectional shapes of the exterior surface 79 of the outer wall 78 and the interior shape of the one of the plurality of passageways 97 may be circular. An end wall 80 may be disposed at the first end 82 of the outer wall 78, and the end wall 80 may be perforated. That is, a plurality of apertures 81 may be formed in the end wall 80. Each of the plurality of apertures 81 may have any suitable maximum diameter (or maximum dimension, if not circular). For example, each of the plurality apertures 81 may have a maximum diameter that is less than 5% (or less than 3%, or less than 2%, or less than 1%) of the diameter of the exterior surface 79 of the outer wall 78. More specifically, each of the plurality of apertures 81 may have a maximum diameter between 90 micrometers and 50 micrometers (e.g., 70 micrometers). The heat of the flame resulting from the ignited non-inert gas may be absorbed through the plurality of apertures 81 formed in the end wall 80 of the flame arrestor 76. The flame arrestor 76 (e.g., the end wall 80 and the outer wall 78) may be integrally formed or may be an assembly of two or more component parts. The flame arrestor 76 may be formed or may comprise any suitable material, such as a sintered metal (e.g., stainless steel). Each flame arrestor may be secured within a desired portion of any of the plurality of passageways 97 (e.g., the passageway 44, 52, 58, 66) in any manner known in the art. For example, a snap ring (not shown) may be disposed around an outer circumferential portion of the exterior surface 79 of the outer wall 78, and the snap ring may engage a circumferential groove formed in a desired portion of any of the plurality of passageways 97.

As illustrated in FIG. 1, a first flame proof joint 75*a* (e.g., a first flame arrestor 76*a*) may be disposed in the input passageway 44. The first flame proof joint 75*a* may be disposed within the first segment 102 of the input passageway 44, and the first flame proof joint 75*a* may be adjacent to the first end 46 of the input passageway 44. A second flame proof joint 75*b* (e.g., a second flame arrestor 76*b*) may be disposed within the outlet passageway 58, and the second flame proof joint 75*b* may be disposed between the first end 60 and the second end 62. A third flame proof joint 75*c* (e.g., a third flame arrestor 76*c*) may be disposed in the exhaust passageway 66. The third flame proof joint 75*c* may be disposed within the second segment 120 of the exhaust passageway 66, and the third flame proof joint 75*c* may be adjacent to the second end 70 of the exhaust passageway 66.

The flame proof joints 75 (e.g., the first, second, and third flame proof joints 75*a*, 75*b*, 75*c*) are positioned at portions of the plurality of passageways 97 that are in communication with components that can be catastrophically harmed by the propagation of flames due to ignition. For example, the first flame proof joint 75*a* may be disposed within the first segment 102 of the input passageway 44 to prevent flames from propagating towards the source 50 of the non-inert control fluid. The second flame proof joint 75*b* may be disposed within the outlet passageway 58 to prevent flames from propagating towards the actuator 64 and control valve (not shown). A third flame proof joint 75*c* (e.g., a third flame arrestor 76*c*) may be disposed in the exhaust passageway 66 to prevent flames from propagating towards the atmosphere 72. Any further flame proof joints 75 may be included or positioned in any further one of the plurality passages 97 (including passages that are not expressly disclosed, such as passageways extending through the base portion 92 to accommodate pressure sensors or transducers) to prevent flames from propagating through that passageway.

In addition to (or as part of) the flameproof barrier assembly 74 previously discussed, other modification may be necessary for the electro-pneumatic controller 10 to be certified as flameproof. Specifically, standards such as ANSI/ASMI B1.20.1 and IEC 60079-1 apply, and, among other things, these standards regulate the types of bolts (or plugs) that are to be used to plug bores on the electro-pneumatic controller 10. For example, the standards require the use of plugs having a National Pipe Thread Taper (NPT), which is a U.S. standard for tapered threads used on threaded pipes and fittings. In contrast to straight threads that are found on a bolt, a taper thread will pull tight (as the flanks of the threads compress against each other) and therefore make a fluid-tight seal. As the thread body is tapered (0.75 in/ft or 62.5 mm/m) a larger diameter keeps compressing into a smaller diameter and finally forms a seal (no clearance remains between the crests and roots of the threads because of the taper). The standards also allow for a straight thread, but a minimum of 0.315" of thread contact is required and an O-ring is necessary to retain pressure.

Figure 9:
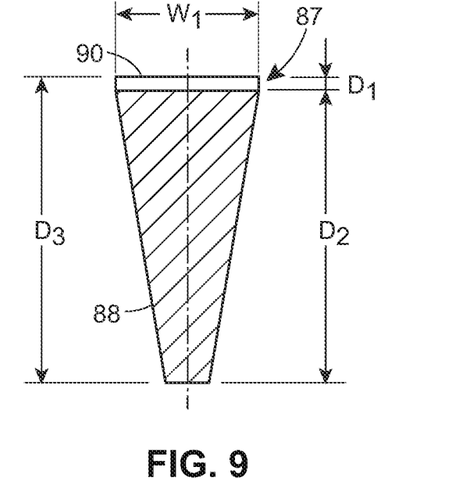
FIG. 9 is a front view of an embodiment of a standard NPT plug.

NPT plugs are commonly available, and such standard off-the-shelf standard plugs are typically used with the electro-pneumatic controller 10. A standard NPT plug 86, as illustrated in FIG. 3A, may have a head portion 87 and an engagement portion 88, and the head portion 87 and engagement portion 88 may extend along a longitudinal axis 89. The head portion 87 may have a first length D1 along the longitudinal axis 89 and the engagement portion 88 may have a second length D2 along the longitudinal axis 89, and these lengths combine to form an overall (third) length D3. The head portion 87 may also have a diameter W1, and the diameter W1 may be greater than a maximum diameter of the engagement portion 88. As illustrated in FIG. 9, the diameter W1 may be equal to or substantially equal to the maximum diameter of the engagement portion 88. Referring to FIG. 3A, the head portion 87 may have a chamfered edge 152 that may be adjacent to a top portion of the engagement portion 87. The head portion 87 may also include a top surface 90, and the top surface may be normal or substantially normal to the longitudinal axis 89 of the standard NPT plug 86. However, the top surface may be faceted (or partially faceted) or curved (or partially curved) or otherwise contoured (or partially contoured). One or more tool retention features 158 may be formed on or in or through the head portion 87. In some embodiments, one or more tool retention features 158 may extend downwardly (e.g., along the longitudinal axis 89 from the top surface 90 towards the engagement portion 88) from the top surface 90 of the head portion 87. As illustrated in FIG. 9, the first length D1 of the head portion 87 may be significantly shorter than the second length D2 of the engagement portion 88. In some embodiments, the head portion 87 may comprise only the top surface 90 (that is, the first length D1 may be 0) and the engagement portion 88 may extend to a circumferential perimeter edge of the top surface 90.

Figure 8:
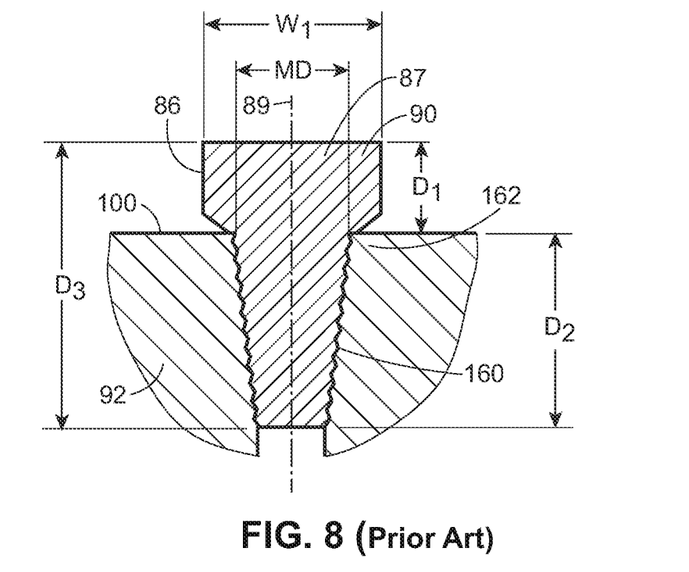
FIG. 8 is a section view of a standard NPT plug disposed within a known bore of an embodiment of an electro-pneumatic controller.

Referring to FIG. 3A, the engagement portion 88 may extend along the longitudinal axis 89 from a first end 190 to a longitudinally-opposite second end 191. The first end 190 may be adjacent to the head portion 87 and the second end 191 may be at or adjacent to an end portion of the standard NPT plug 86. The engagement portion 88 may have an outer surface 153 that may be cylindrical, and all or a portion of the outer surface 153 may be threaded (and may have an NPT standard taper). For example, the outer surface 153 may be threaded from the first end 190 to the second end 191 of the engagement portion 88. In one embodiment of a standard NPT plug 86, the head portion 87 may have a first length D1 of 0.07" (1.78 mm), the engagement portion 88 may have a second length D2 of 0.18" (4.57 mm), and the overall length D3 is therefore 0.25" (6.35 mm). As such, if such a standard NPT plug 86 is secured within a conventional bore 160 (illustrated in FIG. 8, where a maximum diameter MD of a top portion 162 of the conventional bore is less than the diameter W1 of the head portion 87) disposed in the lateral surface 100 of the base portion 92, the top surface 90 of the head portion 87 may be longitudinally offset from the lateral surface 100 of the base portion 92 by (or approximately by) the first length D1 (e.g., the first length D1 of 0.07" (1.78 mm)). This longitudinal offset (i.e., an offset along the longitudinal axis 89 of the standard NPT plug 86) of the top surface 90 of the head portion 87 beyond the lateral surface 100 of the base portion 92 of the electro-pneumatic controller 10 is esthetically displeasing and prevents a label or plate from being applied over a desired portion of the electro-pneumatic controller 10 (e.g., the base portion 92) having such a bore 160.

In order to avoid this longitudinal offset between the top surface 90 of the head portion 87 and a portion of the lateral surface 100 of the base portion 92 (e.g., a planar portion 85 of the lateral surface 100), a bore 148 may include a counterbore portion 149 and an engagement portion 151 that extend along a bore longitudinal axis 150, as illustrated in FIG. 3B. The bore 148 may be a portion (e.g., an end portion) of one of the plurality of passageway 97 or may be any bore or aperture formed in the base portion 92. The bore longitudinal axis 150 may be normal or substantially normal to the lateral surface 100 of the base portion 92 (e.g., the planar portion 85 of the lateral surface 100). The counterbore portion 149 of the bore 148 may include a side surface 164 that may be cylindrical (or at least partially cylindrical) and may not be threaded. In alternative embodiments, all or portions of the side surface 164 may be threaded. The side surface 164 may extend from a first end 166 to a second end 168 along the bore longitudinal axis 150. The counterbore portion 149 may also have a chamfered edge 154 (e.g., if the head portion 87 also has a chamfered edge 152) that may extend form or adjacent to the second end 168 of the side surface. The counterbore portion 149 may also include a bottom surface 180 that may be normal to the side surface 164 and/or the bore longitudinal axis 150, and the chamfered edge 154 may extend between the bottom surface 170 and the side surface 164. In some embodiments, the counterbore portion 149 may only include the side surface 164 and the chain chamfered edge 152 without a bottom portion.

The counterbore portion 149 of the bore 148 may have a fourth length D4 along the bore longitudinal axis 150 and the engagement portion 151 may have a fifth length D5 along the bore longitudinal axis 150, and these lengths combine to form an overall (sixth) length D6. The engagement portion 151 may formed at an end portion on any of the plurality of passageways 97, or the bore 148 may be a blind bore having a bottom surface (not shown). The fourth length D4 of the counterbore portion 149 of the bore 148 may be greater than or equal to the first length D1 of the head portion 87 of the standard NPT plug 86, and the fifth length D5 of the engagement portion 151 of the bore 148 may be greater than or equal to the second length D2 of the engagement portion 88 of the standard NPT plug 86. In some embodiments, the fifth length D5 of the engagement portion 151 of the bore 148 may be less than the second length D2 of the engagement portion 88 of the standard NPT plug 86 if the overall (third) length D3 of the standard NPT plug 86 is less than or equal to the overall (sixth) length D6 of the bore 148.

In addition, the counterbore portion 149 of the bore 148 may have a diameter W2 (e.g., a maximum diameter of the side surface 164) that may be slightly greater than (e.g., 5% to 10% greater than) the diameter W1 of the head portion 87 of the standard NPT plug 86. The engagement portion 151 may have an outer surface 156 that may be cylindrical, and all or a portion of the outer surface 156 may be threaded (and may have an NPT standard taper) and may be adapted to threadedly engage the outer surface 153 of the engagement portion 88 of the standard NPT plug 86 when the standard NPT plug 86 is disposed within the bore 148.

Figure 3C:
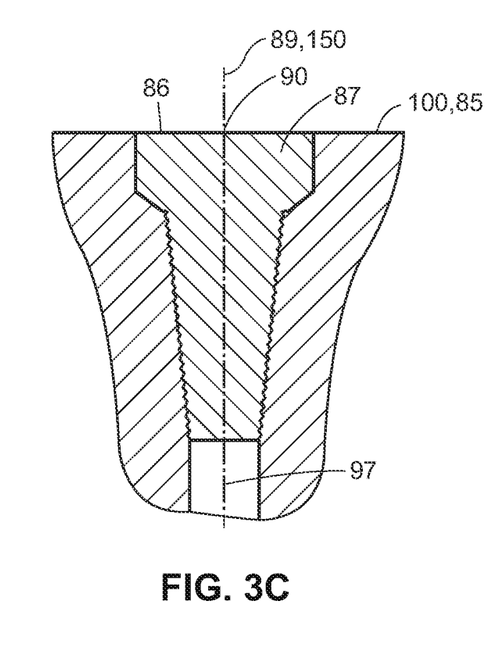
FIG. 3C is a section view of a standard NPT plug disposed within a bore formed in a base portion of an embodiment of an electro-pneumatic controller.
Figure 3D:
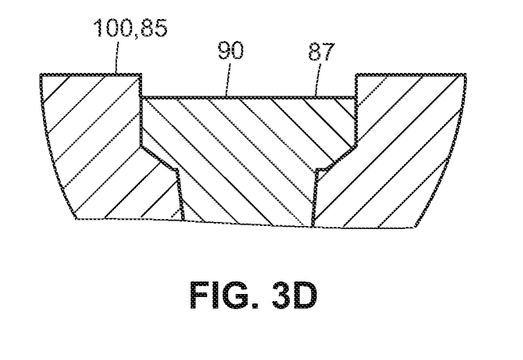
FIG. 3D is a section view of a standard NPT plug disposed within a bore formed in a base portion of an embodiment of an electro-pneumatic controller.

With the longitudinal axis 89 of the standard NPT plug 86 aligned with the bore of the standard NPT plug 86, the engagement portion 88 of the standard NPT plug 86 may be inserted into the engagement portion 151 of the bore 148 and the standard NPT plug 86 may be rotated relative to the bore 148. That is, a tool (not shown) may have a portion inserted into the tool retention feature 158 formed in the top surface 90 of the head portion 87, and the tool may be rotated. By way of this rotation, the threaded portion of the outer surface 153 of the engagement portion 88 of the standard NPT plug 86 threadedly engages the threaded portion of the outer surface 156 of the engagement portion 151 of the bore 148 to secure the standard NPT plug 86 to the base portion 92. When the threaded portion of the outer surface 153 of the engagement portion 88 of the standard NPT plug 86 fully threadedly engages the threaded portion of the outer surface 156 of the engagement portion 151 of the bore 148, the chamfered edge 152 of the head portion 87 may be adjacent or in contact with the chamfered edge 154 of the counterbore portion 149. Also in this position, the head portion 87 of the standard NPT plug 86 may be fully disposed or contained within the counterbore portion 149 of the bore. That is, as illustrated in FIG. 3C, the top surface 90 of the head portion 87 of the standard NPT plug 86 may be coplanar with the lateral surface 100 of the base portion 92 (e.g., a planar portion 85 of the lateral surface 100). In other embodiments, such as that illustrated in FIG. 3D, the top surface 90 of the head portion 87 of the standard NPT plug 86 may be disposed within (e.g., partially or entirely within) the counterbore portion 149 (i.e., disposed such that the top surface 90 of the head portion 87 of the standard NPT plug 86 is disposed between the lateral surface 100 of the base portion 92 and the engagement portion 151 of the bore 148.

With the standard NPT plug 86 disposed as described in the bore 148 of the base portion 92, the top surface 90 of the head portion 87 of the standard NPT plug 86 does not extend upwardly from the lateral surface 100 of the base portion 92 (e.g., a planar portion 85 of the lateral surface 100), thereby creating a smooth cosmetic appearance. Moreover, with the top surface 90 of the head portion 87 of the standard NPT plug 86 coplanar with (or below) the lateral surface 100 of the base portion 92, a label or other attachment can be affixed to the lateral surface 100 of the base portion 92. One having ordinary skill in the art would recognize that the counterbore portion 149 of the bore 148 achieves these objectives while realizing the cost benefits of using off-the-shelf plugs and while maintain the strict standards required for explosion or flameproof housings. The skilled person would recognize that the bore 86 may be disposed on any suitable surface of the base portion 92 and not only the lateral surface(s) 100.

While various embodiments have been described above, this disclosure is not intended to be limited thereto. Variations can be made to the disclosed embodiments that are still within the scope of the appended claims.

What is claimed is:

1. An electro-pneumatic controller comprising:
a base portion having at least one lateral surface, wherein a plurality of passageways are disposed through the base portion, and wherein a bore of the plurality of passageways extends through the at least one lateral surface, the bore having a counterbore portion comprising a chamfered edge and an engagement portion having an outer surface comprising a thread, the chamfered edge of the counterbore portion extending to the engagement portion;
a cap portion having an interior, the cap portion being removably secured to the base portion;
independently operable first and second solenoid valves coupled to the base portion and disposed at least partially within the interior of the cap portion, the first and second solenoid valves each having an interior volume with an inlet, an outlet, and a valve member movable between a closed position preventing fluid flow from the base portion through the interior volume and an open position allowing fluid flow from the base portion through the interior volume, wherein a first one of the plurality of passageways adapted to be coupled to a source of a control fluid extends to the inlet of the first solenoid valve, a second one of the plurality of passageways adapted to vent to atmosphere extends from the outlet of the second solenoid valve, a third one of the plurality of passageways extends between the outlet of the first solenoid valve and the inlet of the second solenoid valve; and a standard NPT plug having a head portion comprising a chamfered edge complementary to the chamfered edge of the counterbore portion of the bore and an engagement portion comprising a shaft extending away from the head portion, the shaft having an outer surface, wherein all or a portion of the outer surface of the standard NPT plug is threaded and is in threaded engagement with all or a portion of the outer surface of the engagement portion of the bore to secure the standard NPT plug to the base portion, wherein a top surface of the head portion of the standard NPT plug is coplanar with the at least one lateral surface of the base portion or is disposed within the counterbore portion of the bore, a lateral surface of the head portion extends along the counterbore portion of the bore, and the chamfered edge of the head portion is in contact with the chamfered edge of the counterbore portion of the bore.

2. The electro-pneumatic controller of claim 1, wherein the standard NPT plug extends along a plug longitudinal axis and the bore extends along a bore longitudinal axis that is aligned with the plug longitudinal axis, and wherein the head portion has a length along the plug longitudinal axis, the counterbore portion has a length along the bore longitudinal axis, and the length of the counterbore portion along the bore longitudinal axis is greater than or equal to the length of the head portion along the plug longitudinal axis.

3. The electro-pneumatic controller of claim 2, wherein a sum of the length of the head portion along the plug longitudinal axis and a length of the engagement portion of the standard NPT plug along the plug longitudinal axis is 0.25" (6.35 mm).

4. The electro-pneumatic controller of claim 1, wherein the standard NPT plug extends along a plug longitudinal axis and the bore extends along a bore longitudinal axis that is aligned with the plug longitudinal axis, and wherein the engagement portion of the standard NPT plug has a length along the plug longitudinal axis, the engagement portion of the bore has a length along the bore longitudinal axis, and the length of the engagement portion of the bore along the bore longitudinal axis is greater than or equal to the length of the engagement portion of the standard NPT plug along the plug longitudinal axis.

5. The electro-pneumatic controller of claim 1, wherein the counterbore portion of the bore has a diameter that is 5% to 10% greater than a diameter of the head portion of the standard NPT plug.

6. The electro-pneumatic controller of claim 1, wherein the bore is disposed at an end portion of the first one of the plurality of passageways or at an end portion of the second one of the plurality of passageways.

7. The electro-pneumatic controller of claim 1, wherein the control fluid is a non-inert gas.

8. The electro-pneumatic controller of claim 1, wherein a flameproof joint is disposed in at least one of the plurality of passageways.

9. The electro-pneumatic controller of claim 1, wherein the counterbore portion is not threaded.

10. A method of providing a bore on a base portion of an electro-pneumatic controller, the base portion comprising at least one lateral surface, wherein a plurality of passageways are disposed through the base portion including a first one of the plurality of passageways adapted to be coupled to a source of a control fluid and a second one of the plurality of passageways, wherein the electro-pneumatic controller includes a cap portion having an interior and that is removably secured to the base portion, the electro-pneumatic controller further including a standard NPT plug having a head portion comprising a chamfered edge and an engagement portion comprising a shaft extending away from the head portion, the shaft having an outer surface comprising a thread, the head portion having a top surface, the method comprising:

providing a counterbore portion of the bore comprising a chamfered edge and an engagement portion of the bore having an outer surface and all or a portion of the outer surface of the engagement portion of the bore is threaded, wherein the chamfered edge of the counterbore portion extends to the engagement portion and the chamfered edge of the counterbore portion of the bore is complementary to the chamfered edge of the head portion of the standard NPT plug; and providing independently operable first and second solenoid valves, each coupled to the base portion and disposed at least partially within the interior of the cap portion, the first and second solenoid valves each having an interior volume with an inlet, an outlet, and a valve member movable between a closed position preventing fluid flow from the base portion through the interior volume and an open position allowing fluid flow from the base portion through the interior volume, wherein the first one of the plurality of passageways extends to the inlet of the first solenoid valve, the second one of the plurality of passageways extends from the outlet of the second solenoid valve, and a third one of the plurality of passageways extends between the outlet of the first solenoid valve and the inlet of the second solenoid valve;

disposing the standard NPT plug within the bore, such that all or a portion of the outer surface of the engagement portion of the standard NPT plug is in threaded engagement with all or a portion of the outer surface of the engagement portion of the bore, the top surface of the head portion of the standard NPT plug is coplanar with the at least one lateral surface of the base portion or is disposed within the counterbore portion of the bore when the standard NPT plug is disposed within the bore, a lateral surface of the head portion extends along the counterbore portion of the bore, and the chamfered edge of the head portion of the standard NPT plug is in contact with the chamfered edge of the counterbore portion of the bore.

11. The method of claim 10, wherein the standard NPT plug extends along a plug longitudinal axis and the bore extends along a bore longitudinal axis that is aligned with the plug longitudinal axis, wherein the head portion has a length along the plug longitudinal axis, the counterbore portion has a length along the bore longitudinal axis, and the length of the counterbore portion along the bore longitudinal axis is greater than or equal to the length of the head portion along the plug longitudinal axis.

12. The method of claim 11, wherein a sum of the length of the head portion along the plug longitudinal axis and a length of the engagement portion of the standard NPT plug along the plug longitudinal axis is 0.25" (6.35 mm).

13. The method of claim 10, wherein the standard NPT plug extends along a plug longitudinal axis and the bore extends along a bore longitudinal axis that is aligned with the plug longitudinal axis, and wherein the engagement portion of the standard NPT plug has a length along the plug longitudinal axis, the engagement portion of the bore has a length along the bore longitudinal axis, and the length of the engagement portion of the bore along the bore longitudinal axis is greater than or equal to the length of the engagement portion of the standard NPT plug along the plug longitudinal axis.

14. The method of claim 10, wherein the counterbore portion of the bore has a diameter that is 5% to 10% greater than a diameter of the head portion of the standard NPT plug.

15. The method of claim 10, wherein the bore is disposed at an end portion of the first one of the plurality of passageways or at an end portion of the second one of the plurality of passageways.

16. The method of claim 10, wherein the control fluid is a non-inert gas.

17. The method of claim 10, wherein a flameproof joint is disposed in at least one of the plurality of passageways.

18. The method of claim 10, wherein the counterbore portion is not threaded.

19. An electro-pneumatic controller comprising:

a base portion having at least one lateral surface, wherein a plurality of passageways are disposed through the base portion including an inlet passageway adapted to be coupled to a source of a control fluid, an outlet passageway adapted to vent to atmosphere, an intermediate passageway, an actuator passageway extending from the intermediate passageway, and wherein at least one bore extends through the at least one lateral surface, the at least one bore having a counterbore portion with a chamfered edge and an engagement portion having an outer surface comprising a thread;

a cap portion having an interior, the cap portion being removably secured to the base portion;

a first solenoid valve coupled to the base portion and disposed at least partially within the interior of the cap portion, the first solenoid valve having an interior volume, an inlet to the interior volume of the first solenoid valve fluidly coupled to the inlet passageway, an outlet fluidly coupled to the intermediate passageway, and a valve member movable between a closed position preventing fluid flow from the base portion through the interior volume of the first solenoid valve and an open position allowing fluid flow from the base portion through the interior volume of the first solenoid valve;

a second solenoid valve coupled to the base portion and disposed at least partially within the interior of the cap portion, the second solenoid valve having an interior volume, an inlet to the interior volume of the second solenoid valve fluidly coupled to the intermediate passageway, an outlet fluidly coupled to the outlet passageway, and a valve member movable between a closed position preventing fluid flow from the base portion through the interior volume of the second solenoid valve and an open position allowing fluid flow from the base portion through the interior volume of the second solenoid valve;

a pneumatic actuator fluidly coupled to the actuator passageway;

a processor operably coupled to the first and second solenoid valves to independently control operation of the first and second solenoid valves to control pressure in the pneumatic actuator; and a standard NPT plug having a head portion having a chamfered edge and an engagement portion having an outer surface, wherein all or a portion of the outer surface of the standard NPT plug is threaded and is in threaded engagement with all or a portion of the outer surface of the engagement portion of the bore to secure the standard NPT plug to the base portion, wherein a top surface of the head portion of the standard NPT plug is coplanar with the at least one lateral surface of the base portion or is disposed within the counterbore portion of the bore, a lateral surface of the head portion extends along the counterbore portion of the bore, and the chamfered edge of the head portion is in contact with the chamfered edge of the counterbore portion.

* * * * *

UNITED STATES PATENT AND TRADEMARK OFFICE
CERTIFICATE OF CORRECTION

PATENT NO. : 10,788,141 B2  
APPLICATION NO. : 15/193973  
DATED : September 29, 2020  
INVENTOR(S) : Jacob T. R. Renollett et al.

Page 1 of 1

It is certified that error appears in the above-identified patent and that said Letters Patent is hereby corrected as shown below:

In the Specification

At Column 6, Line 29, "(Illustrated" should be -- (illustrated --.

At Column 7, Line 30, "RID" should be -- PID --.

At Column 8, Line 31, "absorbing" should be -- absorbing the --.

At Column 8, Line 57, "plurality" should be -- plurality of --.

At Column 11, Line 28, "chain chamfered" should be -- chamfered --.

At Column 11, Line 34, "may" should be -- may be --.

At Column 12, Line 24, "148." should be -- 148). --.

Signed and Sealed this  
Twenty-ninth Day of June, 2021

Drew Hirshfeld  
*Performing the Functions and Duties of the*  
*Under Secretary of Commerce for Intellectual Property and*  
*Director of the United States Patent and Trademark Office*